(12) United States Patent
Fan et al.

(10) Patent No.: US 9,369,593 B2
(45) Date of Patent: Jun. 14, 2016

(54) VOIP TERMINAL AND RINGING PARAMETER SETTING METHOD THEREFOR

(71) Applicant: ZTE Corporation, Shenzhen, Guangdong (CN)

(72) Inventors: Di Fan, Shenzhen (CN); Kun Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/759,615

(22) PCT Filed: Sep. 12, 2013

(86) PCT No.: PCT/CN2013/083417
§ 371 (c)(1),
(2) Date: Jul. 7, 2015

(87) PCT Pub. No.: WO2014/107972
PCT Pub. Date: Jul. 17, 2014

(65) Prior Publication Data
US 2015/0365539 A1    Dec. 17, 2015

(30) Foreign Application Priority Data

Jan. 8, 2013   (CN) .......................... 2013 1 0005801

(51) Int. Cl.
H04M 19/04 (2006.01)
H04M 3/22 (2006.01)
(Continued)

(52) U.S. Cl.
CPC ............ *H04M 19/04* (2013.01); *H04M 1/2535* (2013.01); *H04M 3/2245* (2013.01); *H04M 3/244* (2013.01); *H04M 19/02* (2013.01)

(58) Field of Classification Search
CPC ...................................................... H04M 19/04
See application file for complete search history.

(56) References Cited

U.S. PATENT DOCUMENTS

| 7,106,852 B1 * | 9/2006 | Nelson ................. H04M 1/645 379/387.01 |
| 2001/0024436 A1 | 9/2001 | Barraclough |

(Continued)

FOREIGN PATENT DOCUMENTS

| CN | 1582564 A | 2/2005 |
| CN | 101572639 A | 11/2009 |

(Continued)

OTHER PUBLICATIONS

International Search Report in international application No. PCT/CN2013/083417, mailed on Dec. 19, 2013.

(Continued)

*Primary Examiner* — Sulaiman Nooristany
(74) *Attorney, Agent, or Firm* — Oppendahl Patent Law Firm LLC (57) ABSTRACT

Provided are a VOIP terminal and a ringing parameter setting method therefor. An application scenario detecting module of the VOIP terminal detects an application scenario of the VOIP terminal, and sends a detection result to a parameter matching module of the VOIP terminal, the parameter matching module matches a ringing parameter according to the detection result, and then a parameter setting module of the VOIP terminal sets the VOIP terminal according to the ringing parameter obtained by the matching. Manual setting according to experience is not involved. The set ringing parameter can better meet requirements of various voice user terminals under the VOIP terminal compared with an existing manual setting manner. Abnormal conditions that some voice user terminals ring briefly all the time, some voice user terminals are muted after ringing a sound, even some voice user terminals have no ringing all the time, and so on under the same VOIP terminal can be reduced, and user experience can be improved. At the same time, the cost of ringing parameter maintenance of the VOIP terminal can be also reduced.

19 Claims, 5 Drawing Sheets

(51) Int. Cl.
*H04M 3/24* (2006.01)
*H04M 1/253* (2006.01)
*H04M 19/02* (2006.01)

(56) References Cited

U.S. PATENT DOCUMENTS

2003/0064760 A1 4/2003 Canella
2009/0124243 A1 5/2009 Routley
2011/0058661 A1 3/2011 Wang et al.

FOREIGN PATENT DOCUMENTS

| CN | 101578848 A | 11/2009 |
| CN | 101582958 A | 11/2009 |
| CN | 102017585 A | 4/2011 |
| CN | 103167083 A | 6/2013 |

OTHER PUBLICATIONS

English Translation of the Written Opinion of the International Search Authority in international application No. PCT/CN2013/083417, mailed on Dec. 19, 2013.

Supplementary European Search Report in European application No. 13870526.4, mailed on Feb. 8, 2016.

* cited by examiner

VOIP TERMINAL AND RINGING PARAMETER SETTING METHOD THEREFOR

TECHNICAL FIELD

The present disclosure relates to the field of communications, and particularly to a Voice over Internet Protocol (VOIP) terminal and a ringing parameter setting method therefor.

BACKGROUND

A VOIP terminal digitizes an analog sound, and transmits the analog sound in a form of a data packet in real time over an IP data network. Three major domestic telecommunications operators are actively developing construction of an Ethernet Passive Optical Network (EPON)/Gigabit-Capable PON (GPON) in response to the national Broadband China strategy, thereby greatly increasing commercial application of VOIP services. A voice user terminal including a telephone, a fax machine or an integrated Point of Sale (POS) machine, and so on may be connected under a Plain Old Telephone Service (POTS) interface of the VOIP terminal. Generally, a ringing voltage parameter outputted by the VOIP terminal at present is set by a relevant technician according to experience, or is directly set as a default value. In the meanwhile, ringing voltage offset values are set as 0 in a unified manner. However, there is only one voice user terminal under one VOIP terminal in an existing network sometimes, while there are four or five voice user terminals sometimes. A telephone wire connecting the VOIP terminal and a voice user terminal may be long or short and different voice user terminals also require different voltages. Therefore, abnormal conditions that some voice user terminals ring briefly all the time, some voice user terminals are muted after ringing a sound, even some voice user terminals have no ringing all the time, and so on when the voice user terminals are connected to the same VOIP terminal are usually caused according to an existing ringing parameter setting manner.

SUMMARY

A major technical problem to be solved by embodiments of the present disclosure is to provide a VOIP terminal and a ringing parameter setting method therefor, so as to solve an existing problem that abnormal ringing is caused by setting a ringing parameter manually according to experience.

To solve the technical problem, an embodiment of the present disclosure provides a method for setting a ringing parameter for a VOIP terminal, including that an application scenario of a VOIP terminal is detected;

a ringing parameter is matched according to a detection result;

the VOIP terminal is set according to the ringing parameter.

In an embodiment of the present disclosure, the application scenario may include a single-machine application scenario and a multi-machine application scenario; a corresponding ringing parameter is set for each application scenario; accordingly, the operation that the application scenario of the VOIP terminal is detected may include that the number of voice user terminals currently connected to the VOIP terminal is detected, and when the number of the voice user terminals is larger than or equal to 2, it is determined that the VOIP terminal is in the multi-machine application scenario currently, otherwise, it is determined that the VOIP terminal is in the single-machine application scenario.

In an embodiment of the present disclosure, the application scenario may include a long-line application scenario and a short-line application scenario; a corresponding ringing parameter is set for each application scenario; the operation that the application scenario of the VOIP terminal is detected may include that a loop resistance between the VOIP terminal and a voice user terminal is detected, and when a resistance value of the loop resistance is larger than a preset resistance value, it is determined that the VOIP terminal is in the long-line application scenario currently, otherwise, it is determined that the VOIP terminal is in the short-line application scenario.

In an embodiment of the present disclosure, the application scenario may include a long-line single-machine application scenario, a short-line single-machine application scenario, a long-line multi-machine application scenario and a short-line multi-machine application scenario; a corresponding ringing parameter is set for each application scenario; a voice user terminal is connected to the VOIP terminal via a connecting line; the operation that the application scenario of the VOIP terminal is detected may include that:

the number of voice user terminals currently connected with the VOIP terminal is detected, and a loop resistance between the VOIP terminal and the voice user terminals is detected;

when it is determined that the number of the voice user terminals is larger than or equal to 2, and a resistance value of the loop resistance is larger than a preset resistance value, it is determined that the VOIP terminal is in the long-line multi-machine application scenario currently;

when it is determined that the number of the voice user terminals is larger than or equal to 2, and a resistance value of the loop resistance is smaller than or equal to the preset resistance value, it is determined that the VOIP terminal is in the short-line multi-machine application scenario currently;

when it is determined that the number of the voice user terminals is smaller than 2, and a resistance value of the loop resistance is smaller than or equal to the preset resistance value, it is determined that the VOIP terminal is in the short-line single-machine application scenario currently;

when it is determined that the number of the voice user terminals is smaller than 2, and a resistance value of the loop resistance is larger than the preset resistance value, it is determined that the VOIP terminal is in the long-line single-machine application scenario currently.

In an embodiment of the present disclosure, the operation that the number of the voice user terminals currently connected to the VOIP terminal is detected may include that ring streams received by the VOIP terminal are detected and the number of the voice user terminals currently connected to the VOIP terminal is determined according to the number of the detected ring streams.

In an embodiment of the present disclosure, the ringing parameter may include a ringing voltage parameter.

In an embodiment of the present disclosure, the ringing voltage parameter may include a peak value, and/or an effective value, and/or a frequency, and/or an offset value of a ringing voltage.

In an embodiment of the present disclosure, after the VOIP terminal is set according to the ringing parameter, the method further may include that ringing of the voice user terminals connected with the VOIP terminal is tested according to the ringing parameter which has been set to determine whether the ringing is normal; if not normal, then the ringing parameter is corrected.

In an embodiment of the present disclosure, the application scenario further may include a user-defined application scenario, for which a ringing voltage correction parameter is set; the operation that the ringing parameter is corrected may include that the VOIP terminal is set according to the ringing voltage correction parameter, then the ringing of the voice user terminals connected with the VOIP terminal is tested according to the ringing voltage correction parameter which has been set, to determine whether the ringing is normal.

In an embodiment of the present disclosure, the ringing voltage correction parameter may include ringing voltage correction peak values of a plurality of levels; the operation that the VOIP terminal is set according to the ringing voltage correction parameter and the ringing of the voice user terminals connected with the VOIP terminal is tested may include that a ringing voltage correction peak value of a corresponding level is selected from the ringing voltage correction peak values of the plurality of levels according to a first preset rule to set the VOIP terminal, then the ringing of the voice user terminals connected with the VOIP terminal is tested until a test result is normal or the ringing voltage correction peak values of the plurality of levels are all selected.

In an embodiment of the present disclosure, the ringing voltage correction parameter further may include ringing voltage correction offset values of a plurality of levels; when the ringing voltage correction offset values of the plurality of levels are all selected and a ringing test result is still abnormal, the method further may include that a ringing voltage correction peak value of a corresponding level is selected from the ringing voltage correction peak values of the plurality of levels according to a second preset rule and a ringing voltage correction offset value of a corresponding level is selected from the ringing voltage correction offset values of the plurality of levels according to a third preset rule, so as to set the VOIP terminal, then the ringing of the voice user terminals connected with the VOIP terminal is tested until a test result is normal or the ringing voltage correction peak values of the plurality of levels and/or the ringing voltage correction offset values of the plurality of levels are all selected.

An embodiment of the present disclosure further provides a VOIP terminal, including an application scenario detecting module, a parameter matching module and a parameter setting module, wherein the application scenario detecting module is configured to detect an application scenario of the VOIP terminal, and send a detection result to the parameter matching module;

the parameter matching module is configured to match a ringing parameter according to the detection result, and send the ringing parameter to the parameter setting module; and the parameter setting module is configured to set the VOIP terminal according to the ringing parameter.

In an embodiment of the present disclosure, the application scenario may include a single-machine application scenario and a multi-machine application scenario; a corresponding ringing parameter is set for each application scenario; the operation that the application scenario detecting module detects the application scenario of the VOIP terminal may include that the application scenario detecting module detects the number of voice user terminals currently connected to the VOIP terminal, and when the number of voice user terminals is larger than or equal to 2, the application scenario detecting module determines that the VOIP terminal is in the multi-machine application scenario currently, otherwise, the application scenario detecting module determines that the VOIP terminal is in the single-machine application scenario.

In an embodiment of the present disclosure, the application scenario may include a long-line application scenario and a short-line application scenario; a corresponding ringing parameter is set for each application scenario; the operation that the application scenario detecting module detects the application scenario of the VOIP terminal may include that the application scenario detecting module detects a loop resistance between the VOIP terminal and a voice user terminal, and when a resistance value of the loop resistance is larger than a preset resistance value, determines that the VOIP terminal is in the long-line application scenario currently, otherwise determines that the VOIP terminal is in the short-line application scenario otherwise.

In an embodiment of the present disclosure, the application scenario may include a long-line single-machine application scenario, a short-line single-machine application scenario, a long-line multi-machine application scenario and a short-line multi-machine application scenario; a corresponding ringing parameter is set for each application scenario; a voice user terminal is connected to the VOIP terminal via a connecting line; the operation that the application scenario detecting module detects the application scenario of the VOIP terminal may include that:

the application scenario detecting module detects the number of voice user terminals currently connected with the VOIP terminal, and detects a loop resistance between the VOIP terminal and the voice user terminals;

when it is determined that the number of the voice user terminals is larger than or equal to 2, and a resistance value of the loop resistance is larger than a preset resistance value, it is determined that the VOIP terminal is in the long-line multi-machine application scenario currently;

when it is determined that the number of the voice user terminals is larger than or equal to 2, and a resistance value of the loop resistance is smaller than or equal to the preset resistance value, it is determined that the VOIP terminal is in the short-line multi-machine application scenario currently;

when it is determined that the number of the voice user terminals is smaller than 2, and a resistance value of the loop resistance is smaller than or equal to the preset resistance value, it is determined that the VOIP terminal is in the short-line single-machine application scenario currently;

when it is determined that the number of the voice user terminals is smaller than 2, and a resistance value of the loop resistance is larger than the preset resistance value, it is determined that the VOIP terminal is in the long-line single-machine application scenario currently.

In an embodiment of the present disclosure, the operation that the number of the voice user terminals currently connected to the VOIP terminal is detected may include that ring streams received by the VOIP terminal are detected, and the number of the voice user terminals currently connected to the VOIP terminal is determined according to the number of the detected ring streams.

In an embodiment of the present disclosure, the ringing parameter may include a ringing voltage parameter.

In an embodiment of the present disclosure, the ringing voltage parameter may include a peak value, and/or an effective value, and/or a frequency, and/or an offset value of a ringing voltage.

In an embodiment of the present disclosure, the VOIP terminal further may include a testing module and a correcting module; wherein the testing module is configured to test, according to the set ringing parameter, ringing of the voice user terminals connected with the VOIP terminal to determine whether the ringing is normal; and the correcting module is configured to correct the ringing parameter when the testing module determines that the ringing is abnormal.

In an embodiment of the present disclosure, the application scenario further may include a user-defined application scenario, for which a ringing voltage correction parameter is set;

the operation that the correcting module corrects the ringing parameter may include that the correcting module sets the VOIP terminal according to the ringing voltage correction parameter, then the testing module tests ringing of the voice user terminals connected with the VOIP terminal to determine whether the ringing is normal.

In an embodiment of the present disclosure, the ringing voltage correction parameter may include ringing voltage correction peak values of a plurality of levels; the operation that the correcting module sets the VOIP terminal according to the ringing voltage correction parameter and the testing module tests the ringing of the voice user terminals connected with the VOIP terminal may include that the correcting module selects a ringing voltage correction peak value of a corresponding level from the ringing voltage correction peak values of the plurality of levels according to a first preset rule to set the VOIP terminal, then the testing module tests the ringing of the voice user terminals connected with the VOIP terminal until a test result is normal or the ringing voltage correction peak values of the plurality of levels are all selected.

In an embodiment of the present disclosure, the ringing voltage correction parameter further may include ringing voltage correction offset values of a plurality of levels; when the ringing voltage correction offset values of the plurality of levels are all selected and a ringing test result is still abnormal, the correcting module is further configured to select, according to a second preset rule, a ringing voltage correction peak value of a corresponding level from the ringing voltage correction peak values of the plurality of levels, and select, according to a third preset rule, a ringing voltage correction offset value of a corresponding level from the ringing voltage correction offset values of the plurality of levels, so as to set the VOIP terminal; and the testing module is further configured to test the ringing of the voice user terminals connected with the VOIP terminal until a test result is normal, or the ringing voltage correction peak values of the plurality of levels and/or the ringing voltage correction offset values of the plurality of levels are all selected.

The embodiments of the present disclosure have the following beneficial effect:

In a VOIP terminal and a ringing parameter setting method therefor provided by the embodiments of the present disclosure, an application scenario detecting module of the VOIP terminal detects an application scenario of the VOIP terminal and sends a detection result to a parameter matching module of the VOIP terminal, the parameter matching module matches a corresponding ringing parameter according to the detection result, and then a parameter setting module of the VOIP terminal sets the VOIP terminal according to the corresponding ringing parameter obtained through the matching. Thus, a corresponding ringing parameter is matched automatically according to an application scenario in which the VOIP terminal is located so as to set the ringing parameter of the VOIP terminal in the embodiments of the present disclosure instead of setting the ringing parameter of the VOIP terminal manually according to experience. The set ringing parameter can better meet requirements of various voice user terminals in the VOIP case, compared with an existing manual setting manner. Abnormal conditions, in which some voice user terminals ring briefly all the time, some voice user terminals are muted after ringing a sound, even some voice user terminals have no ringing all the time, and so on when the voice user terminals are connected with the same VOIP terminal, can be reduced, and the satisfaction of user experience can be improved. At the same time, the cost of maintenance of a ringing parameter of the VOIP terminal can be also reduced.

Further, ringing of a voice user terminal may be further tested according to a ringing parameter after the ringing parameter of the VOIP terminal is set via the foregoing manner in the embodiments of the present disclosure. When it is determined that the test is abnormal, the ringing parameter of the VOIP terminal may be further corrected, which can further reduce abnormal ringing and improve the ringing reliability and the satisfaction of user experience.

DETAILED DESCRIPTION

The present disclosure will be further expounded through specific embodiments and in combination with the accompanying drawings.

Figure 1:
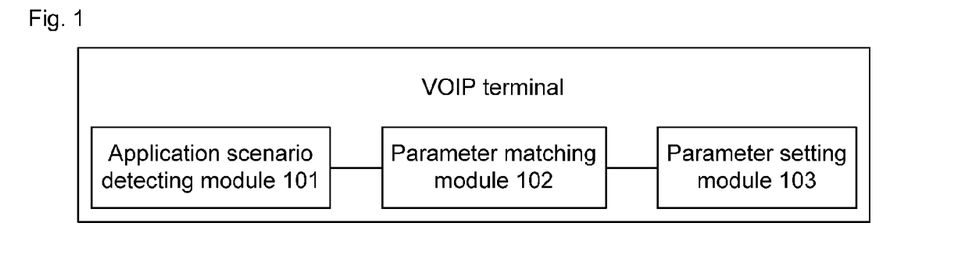
FIG. 1 is the first structural diagram of a VOIP terminal according to an embodiment of the present disclosure.

Please refer to FIG. 1, the figure shows a structural diagram of a VOIP terminal provided by an embodiment, including an application scenario detecting module 101, a parameter matching module 102 and a parameter setting module 103, and further including at least one POTS interface. A voice user terminal is connected with the VOIP terminal through the POTS interface, wherein the application scenario detecting module 101 is configured to detect an application scenario of the VOIP terminal, and send a detection result to the parameter matching module 102.

The application scenario of the VOIP terminal in the present embodiment may be selected and set according to factors including a specific application environment of the VOIP terminal and different requirements of various users and so on.

The parameter matching module 102 is configured to match a corresponding ringing parameter according to the detection result, and send the matched ringing parameter to the parameter setting module 102.

Specifically, corresponding ringing parameters may be set in advance according to various application scenarios in the present embodiments. After an application scenario in which the VOIP terminal is located currently is detected, it is only necessary to invoke a ringing parameter corresponding to the application scenario accordingly.

The ringing parameter in the present embodiment may include a ringing voltage parameter. Specifically, the ringing voltage parameter in the present embodiment may include at least one of following: a peak value, or an effective value, a frequency, and an offset value of a ringing voltage, which may be selected and set according to a practical application environment.

The parameter setting module 103 is configured to set the VOIP terminal according to the ringing parameter obtained through the matching.

Thus, in the present embodiment, a corresponding ringing parameter is matched automatically according to an application scenario in which the VOIP terminal is located so as to set the ringing parameter of the VOIP terminal instead of setting the ringing parameter of the VOIP terminal manually according to experience, thus better satisfying requirements of various voice user terminals under VOIP, reducing abnormal ringing and reducing the cost of ringing parameter maintenance of the VOIP terminal.

The aforementioned application scenarios in the present embodiment may be selected and set according to factors including a specific application environment of the VOIP terminal and different requirements of various users, and so on. Descriptions will be provided below by only taking several setting conditions as examples.

Figure 2:
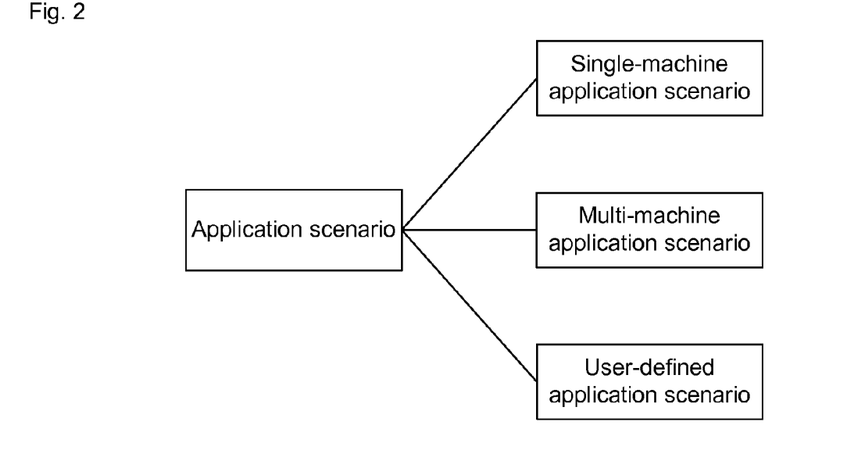
FIG. 2 is the first schematic diagram of an application scenario of a VOIP terminal according to an embodiment of the present disclosure.

The first setting manner of application scenarios is that the application scenarios are set to include, according to the number of voice user terminals connected with the VOIP terminal, a single-machine application scenario and a multi-machine application scenario. Please refer to FIG. 2, a corresponding ringing parameter is set for each application scenario. At the moment, the operation that the application scenario detecting module 101 detects the application scenario of the VOIP terminal may include that:

the application scenario detecting module 101 detects the number of voice user terminals currently connected with the VOIP terminal, and when the number of the detected voice user terminals is larger than or equal to 2, determines that the VOIP terminal is in the multi-machine application scenario currently, otherwise determines that the VOIP terminal is in the single-machine application scenario. Detecting the number of the voice user terminals currently connected with the VOIP terminal in the present embodiment may specifically include that ringing streams received by the VOIP terminal are detected, and the number of the voice user terminals currently connected with the VOIP terminal is determined according to the detected ringing streams.

Figure 3:
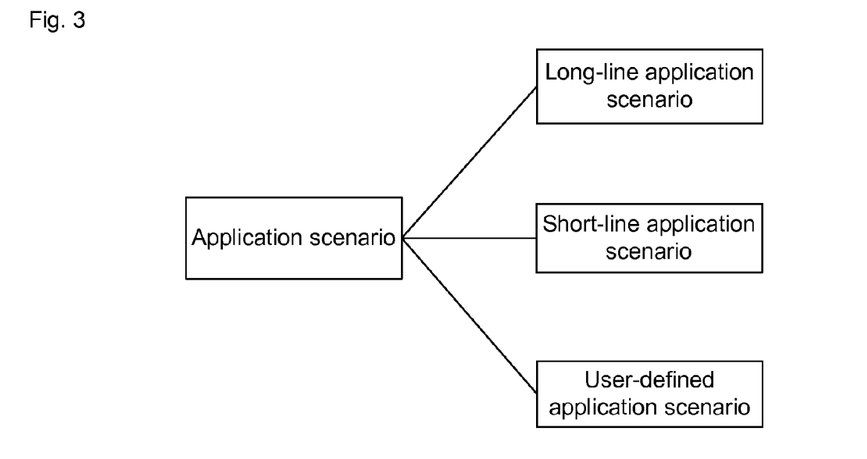
FIG. 3 is the second schematic diagram of an application scenario of a VOIP terminal according to an embodiment of the present disclosure.

The second setting manner of application scenarios may include that the application scenarios are set to include a long-line application scenario and a short-line application scenario according to the length of a connecting line of a voice user terminal and the VOIP terminal. Please refer to FIG. 3, a corresponding ringing parameter is set for each application scenario. At the moment, the operation that the application scenario detecting module 101 detects the application scenario of the VOIP terminal may include that:

the application scenario detecting module detects a loop resistance between the VOIP terminal and the voice user terminal; when a resistance value of the loop resistance is larger than a preset resistance value, it is indicated that the connecting line between the VOIP terminal and the voice user terminal is relatively long, and it is determined that the VOIP terminal is in the long-line application scenario currently; otherwise, it is determined that the VOIP terminal is in the short-line application scenario. The preset resistance value in the present embodiment may be also selected and set according to a practical condition in the present embodiment. For example, the preset resistance value may be set as 1.8 KΩ.

Figure 4:
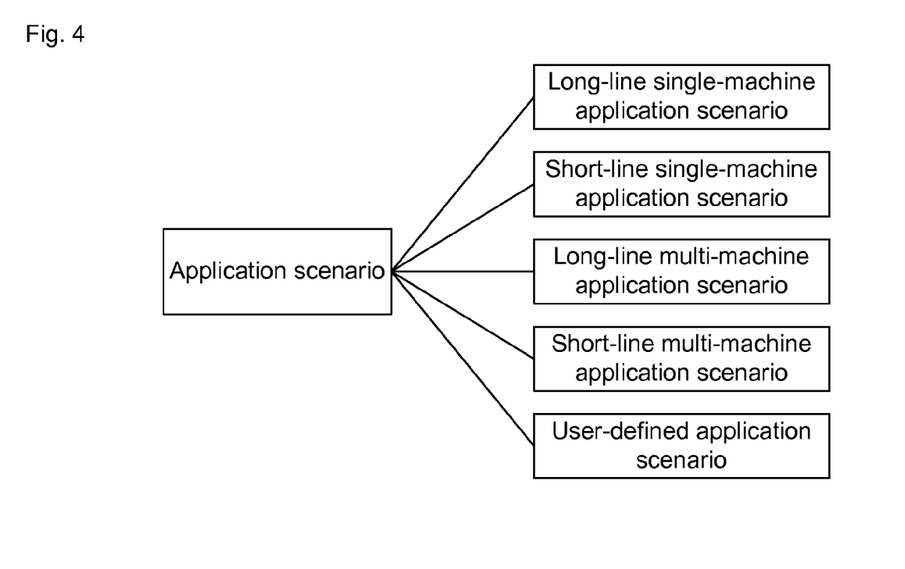
FIG. 4 is the third schematic diagram of an application scenario of a VOIP terminal according to an embodiment of the present disclosure.

The third setting manner of application scenarios may include that the application scenarios are set to include a long-line single-machine application scenario, a short-line single-machine application scenario, a long-line multi-machine application scenario and a short-line multi-machine application scenario by combining the first setting manner and the second setting manner. Please refer to FIG. 4, a corresponding ringing parameter is set for each application scenario. At the moment, the operation that the application scenario detecting module 101 detects the application scenario of the VOIP terminal may include that:

the application scenario detecting module detects the number of voice user terminals currently connected with the VOIP terminal and detects a loop resistance between the VOIP terminal and the voice user terminals. A specific detection method may be implemented by the foregoing method.

When it is determined that the number of the voice user terminals is larger than or equal to 2, and a resistance value of the loop resistance is larger than a preset resistance value, it is determined that the VOIP terminal is in the long-line multi-machine application scenario currently;

When it is determined that the number of the voice user terminals is larger than or equal to 2, and the resistance value of the loop resistance is smaller than or equal to the preset resistance value, it is determined that the VOIP terminal is in the short-line multi-machine application scenario currently;

When it is determined that the number of the voice user terminals is smaller than 2, and the resistance value of the loop resistance is smaller than or equal to the preset resistance value, it is determined that the VOIP terminal is in the short-line single-machine application scenario currently;

When it is determined that the number of the voice user terminals is smaller than 2, and the resistance value of the loop resistance is larger than the preset resistance value, it is determined that the VOIP terminal is in the long-line single-machine application scenario currently.

The ringing voltage parameter, i.e. the peak value, and/or the effective value, and/or the frequency, and/or the offset value of the ringing voltage, may be set after the application scenario in which the VOIP terminal is located currently is detected and the corresponding ringing parameter is matched via the foregoing steps.

Although requirements of various voice user terminals connected with the VOIP terminal may be satisfied more easily after the ringing parameter of the VOIP terminal is set via the foregoing process compared with an existing manner of performing manual setting according to an empirical value, ringing may be further tested according to the set ringing parameter and further corrected according to a test result in the present embodiment in order to further improve the ringing reliability. Please refer to FIG. 5, the VOIP terminal in the present embodiment may further include a testing module 104 and a correcting module 105, wherein the testing module 104 is configured to test, according to the ringing parameter which has been already set, ringing of the voice user terminals connected with the VOIP terminal to determine whether the ringing is normal. If not normal, the ringing parameter of the VOIP terminal is corrected by the correcting module.

Figure 5:
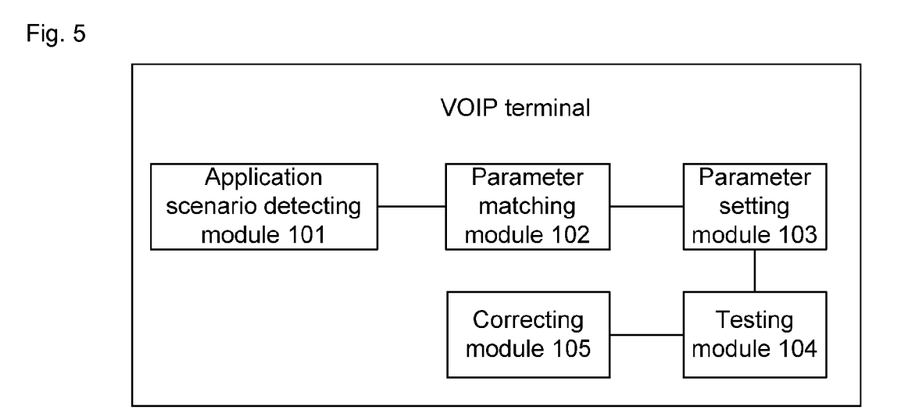
FIG. 5 is the second structural diagram of a VOIP terminal according to an embodiment of the present disclosure.

Correspondingly, the application scenarios in the present embodiment may further include a user-defined application scenario. Please refer to FIG. 2 to FIG. 4, the user-defined application scenario is provided with a ringing voltage correction parameter. The operation that the correcting module 105 corrects the ringing parameter may include that:

the correcting module 105 sets the VOIP terminal according to the ringing voltage correction parameter, and then the testing module 104 tests the ringing of the voice user terminals connected with the VOIP terminal to determine whether the ringing is normal.

Preferably, the ringing voltage correction parameter in the present embodiment may include ringing voltage correction peak values of a plurality of levels, e.g. a ringing voltage correction peak value is set as 660V to 90V or 30V to 150V. Specifically, the levels may be selected and set according to requirements of various voice user terminals and so on. The operation that the correcting module 105 sets the VOIP terminal according to the ringing voltage correction parameter, and the testing module 104 tests the ringing of the voice user terminals connected with the VOIP terminal may include that the correcting module 105 selects, from the ringing voltage correction peak values of the plurality of levels, a ringing voltage correction peak value of a corresponding level according to a first preset rule to set the VOIP terminal, then the testing module 104 tests the ringing of the voice user terminals connected with the VOIP terminal until a test result is normal or the ringing voltage correction peak values of the plurality of levels are all selected. The first preset rule in the present embodiment may refer to that the selection is performed from a low level to a high level, or may also refer to that the selection is performed from a high level to a low level, or a level is selected randomly and so on.

Figure 6:
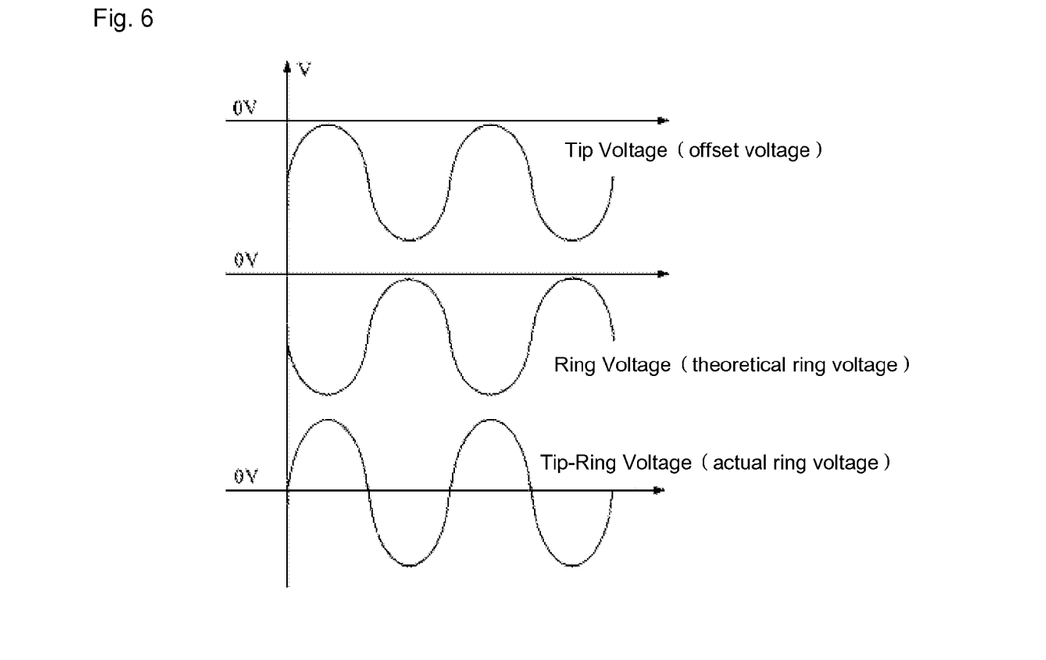
FIG. 6 is a schematic diagram of an existing ringing voltage.
Figure 7:
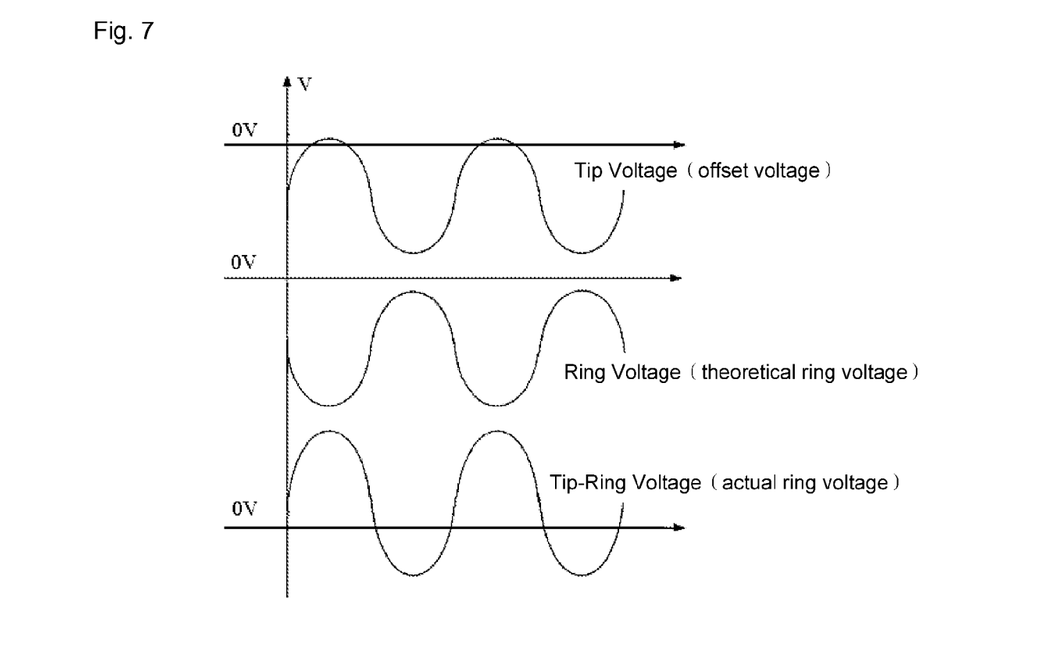
FIG. 7 is a schematic diagram of a ringing voltage according to an embodiment of the present disclosure.

The reliability of setting the ringing parameter of the VOIP terminal may be further ensured through the correction process. However, since $V_{TipRing}$ is a sinusoidal curve and the positive amplitude is equal to the negative amplitude when a ringing voltage offset outputted by the VOIP terminal is set as 0, as shown in FIG. 6, there are many types of voice user terminals during practical application, including telephones, fax machines, integrated POS machines and so on, a relatively high ringing voltage is required sometimes, and the ringing voltage offset set as 0 is hardly satisfactory. Please refer to FIG. 7, relatively low energy may be outputted to output a relatively high voltage peak value when a ringing voltage offset value is not 0. FIG. 7 is a ringing curve when a ringing voltage offset is not 0. $V_{TipRing}$ is an upward sinusoidal curve and a relatively high ringing voltage peak value is outputted. Based on the foregoing analysis, the ringing parameter of the VOIP terminal may be further corrected or set in combination with an offset value of a ringing voltage in the present embodiment. At the moment, the ringing voltage correction parameter may further include ringing voltage correction offset values of a plurality of levels, e.g. a ringing voltage correction offset value may be set as 0V-30V or 0V-60V. Specifically, a level may be also selected and set according to requirements of various voice user terminals and so on.

Correction may be further performed in combination with a ringing voltage correction offset value when the ringing voltage correction peak values of the plurality of levels are all selected and a ringing test result is still abnormal during the correction process, specifically including the following process:

the correcting module selects, according to a second preset rule, a ringing voltage correction peak value of a corresponding level from the ringing voltage correction peak values of the plurality of levels, and selects, according to a third preset rule, a ringing voltage correction offset value of a corresponding level from the ringing voltage correction offset values of the plurality of levels, so as to set the VOIP terminal, and then the testing module tests the ringing of the voice user terminals connected with the VOIP terminal until a test result is normal, or the ringing voltage correction peak values of the plurality of levels and/or the ringing voltage correction offset value of the plurality of levels are all selected.

In the present embodiment, the second preset rule may refer to that the ringing voltage correction peak value of the highest level in the ringing voltage correction peak values of the plurality of levels is selected, or may also refer to that several relatively large ringing voltage correction peak values in the front are selected, or may even refer to that ringing voltage correction peak values of corresponding levels are selected in turn or randomly from the ringing voltage correction peak values of the plurality of levels. Similarly, the third preset rule in the present embodiment may refer to that the ringing voltage correction offset value of the highest level is selected from the ringing voltage correction offset values of the plurality of levels, or may also refer to that several relatively large ringing voltage correction offset values in the front are selected, or may even refer to that ringing voltage correction offset values of corresponding levels are selected in turn or randomly from the ringing voltage correction offset values of the plurality of levels. A specific selection rule may be chosen according to a practical condition.

Figure 8:
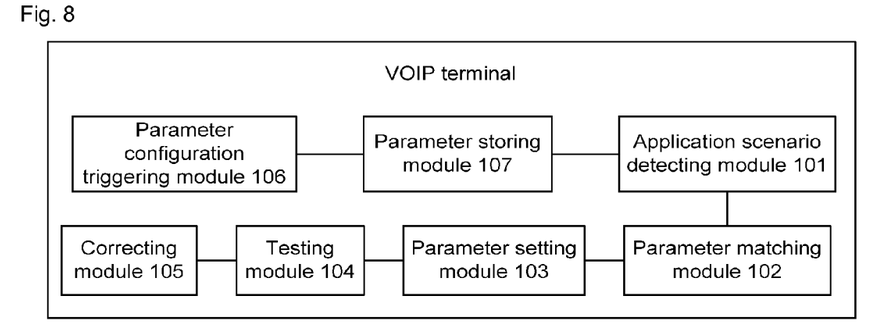
FIG. 8 is the third structural diagram of a VOIP terminal according to an embodiment of the present disclosure.

Please refer to FIG. 8, the VOIP terminal in the present embodiment may preferably further include a parameter configuration trigging module 106 and a parameter storing module 107, wherein the parameter configuration trigging module 106 is configured to trigger a parameter configuration process of the VOIP terminal;

the parameter storing module 107 is configured to store various parameters during the parameter configuration process. The parameter configuration trigging module 106 in the present embodiment may be specifically a WEB module. A user may start the parameter configuration process by sending a corresponding instruction via the WEB module. The parameter storing module 107 in the present embodiment may be a register and so on. At least one of the application scenario detecting module 101, the parameter matching module 102, the parameter setting module 103, the testing module 104 and the correcting module 105 in the present embodiment may be implemented by software, or may be also implemented by hardware. Each foregoing module may be integrated in a Subscribe Line Interface Circuit (SLIC) of the VOIP terminal. The SLIC in the present embodiment may further include a ringing voltage increasing and decreasing circuit. The ringing parameter of the VOIP terminal may be specifically set by setting a related parameter of the ringing voltage increasing and decreasing circuit. The present disclosure will be further described by further combining the present embodiment with a specific setting process as an example in order to better understand the present disclosure.

Figure 9:
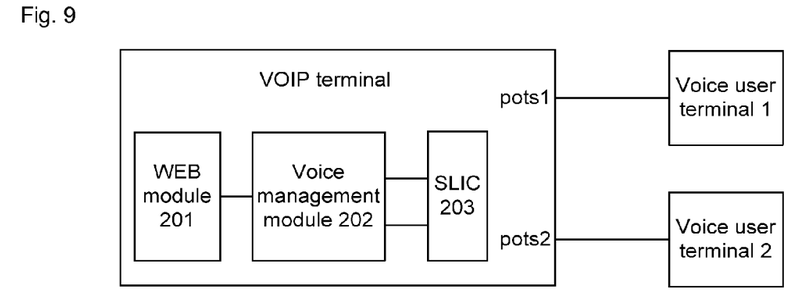
FIG. 9 is a structural diagram of a VOIP communication system according to an embodiment of the present disclosure.

FIG. 9 shows a system architecture in the present embodiment. The system may include a voice user terminal and a VOIP terminal, wherein the voice user terminal is generally a telephone, a fax machine, an integrated POS machine and so on, connected with the VOIP terminal via a telephone wire, connected with a network of an upper layer via the VOIP terminal and configured to receive a voice signal of a user.

The VOIP terminal is located between the network of the upper layer and the voice user terminal to implement voice communication of the voice user terminal. The VOIP terminal may include a WEB module 201, a voice management module 202 (i.e. the parameter storing module), an SLIC 203 (which may include the application scenario detecting module, the parameter matching module, the parameter setting module, the testing module and the correcting module), and a POTS interface and so on, wherein the WEB module 201 is configured to start a ringing test; the voice management module 202 is configured to store a ringing parameter and the SLIC 203 is configured to execute the parameter configuration process.

When the voice user terminal is a called party, the SLIC 203 generates a ringing signal which is sent to the POTS interface, and then sent to the voice user terminal via the telephone wire. The voice user terminal rings after receiving the ringing signal so as to prompt a new incoming call to a voice user. An embodiment of the present disclosure will be further described hereinafter by taking the application scenario as shown in FIG. 4 as an example.

Figure 10:
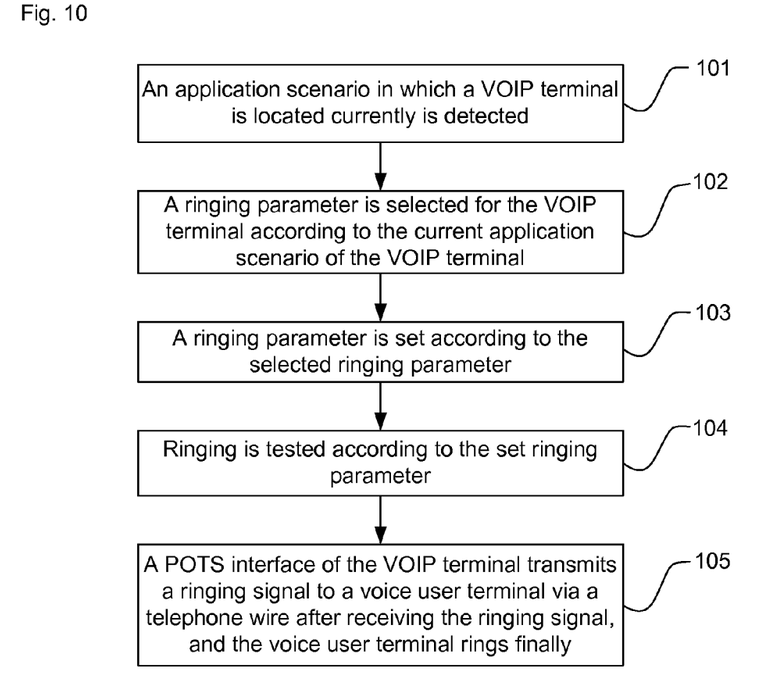
FIG. 10 is a schematic diagram of a ringing process of a voice user terminal according to an embodiment of the present disclosure.

Please refer to FIG. 10, a process in which a voice user terminal rings in the present embodiment may include the following steps:

step 101: an SLIC detects an application scenario in which a VOIP terminal is located currently; the application scenario of the VOIP terminal may be specifically obtained according to a test result including a loop resistance or the number of ringing streams and so on; the application scenario may be one of a long-line single-machine application scenario, a short-line single-machine application scenario, a long-line multi-machine application scenario and a short-line multi-machine application scenario;

step 102: the SLIC selects a corresponding ringing parameter for the VOIP terminal according to the current application scenario of the VOIP terminal;

step 103: the SLIC sets the ringing parameter according to the selected ringing parameter; specifically, an effective value, an offset, and a frequency and so on of a peak value h of a ringing voltage may be set and stored in a register;

step 104: the SLIC tests ringing according to the set ringing parameter, and modifies a voltage increasing and decreasing circuit of the ringing according to a parameter value stored by the ringing voltage register so as to modify an output of the ringing voltage; and step 105: the VOIP terminal transmits a ringing signal to the voice user terminal via a telephone wire after a POTS interface of the VOIP terminal receives the ringing signal and the voice user terminal rings finally.

Figure 11:
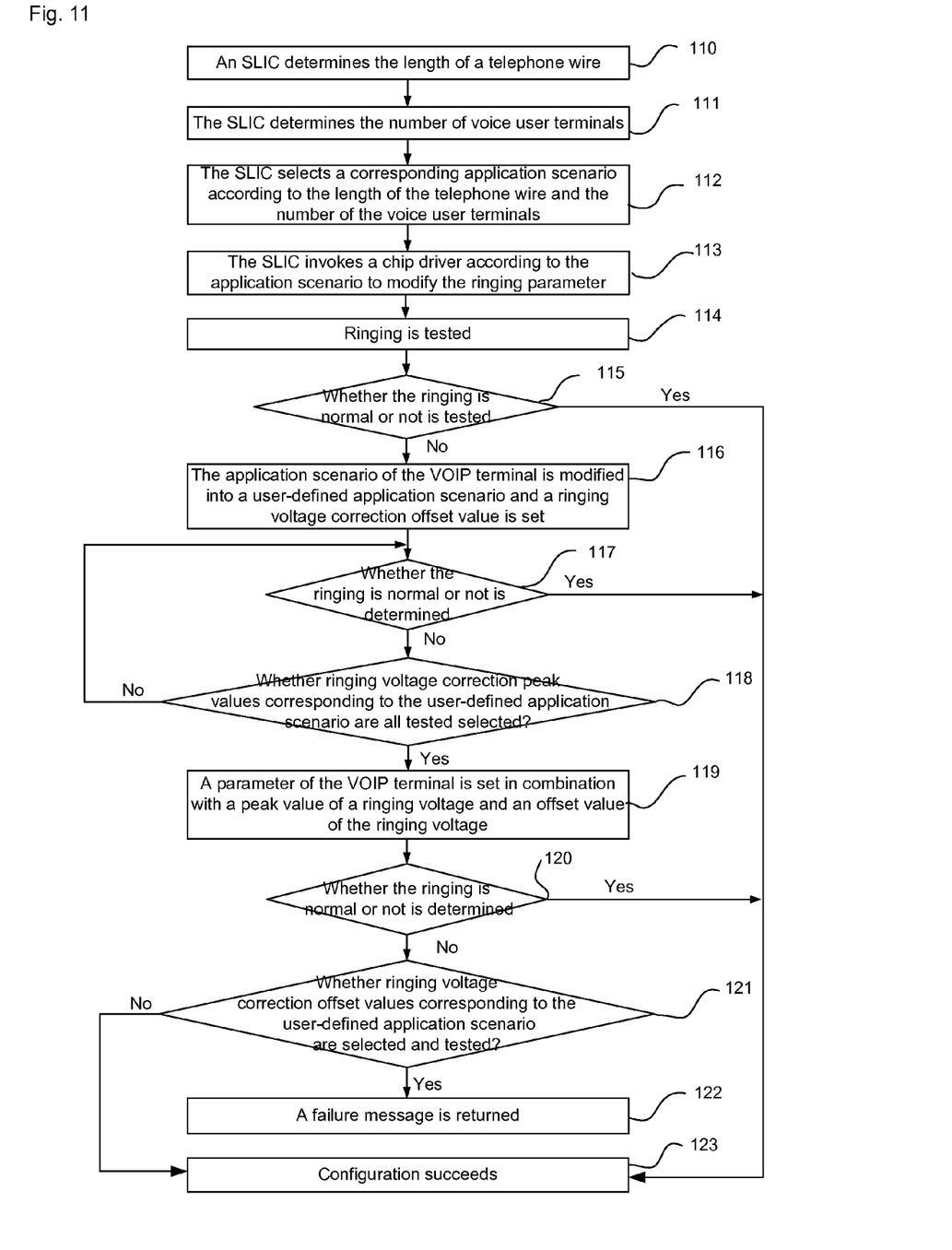
FIG. 11 is a schematic diagram of a configuration process of a parameter of a VOIP terminal according to an embodiment of the present disclosure.

Please refer to FIG. 11 for a specific ringing parameter configuration process involved in FIG. 10, specifically including the following steps:

step 110: the SLIC determines the length of the telephone wire, specifically including that a 112 test is performed for a loop resistance between the VOIP terminal and the voice user terminal; it is determined that the telephone wire is relatively long if the loop resistance is larger than 1.8 KΩ, and then a long-line parameter is selected; otherwise, a short-line parameter is selected;

step 111: the SLIC determines the number of voice user terminals; the number of the user terminals may be specifically determined by the 112 test of an equivalent number of telephones; if the number of ringing streams is larger than or equal to 2, it is determined that there is a plurality of telephones, otherwise, there is a single telephone;

step 112: the SLIC selects a corresponding application scenario from the long-line single-machine application scenario, the short-line single-machine application scenario, the long-line multi-machine application scenario and the short-line multi-machine application scenario in FIG. 4 according to the length of the telephone wire and the number of the voice user terminals;

step 113: the SLIC invokes a chip driver according to the application scenario to modify the ringing parameter and stores the ringing parameter in a chip register;

step 114: the SLIC tests the ringing; the ringing may be specifically tested through the 112 test of the ringing, i.e. the voltage increasing and decreasing circuit of the ringing is modified according to a value in the register, and then a corresponding ringing stream signal is outputted to drive a voice user terminal to ring finally;

step 115: whether the ringing test is normal is determined; if normal, then step 123 is performed, otherwise, step 116 is performed;

step 116: the SLIC detects that the 112 test of the ringing is abnormal and modifies the application scenario of the VOIP terminal into a user-defined application scenario, and then sets and selects a ringing voltage correction parameter from ringing voltage correction parameters corresponding to the application scenario according to a certain rule, and then step 117 is performed;

step 117: the SLIC tests the ringing; the ringing may be specifically tested via the 112 test of the ringing to determine whether the ringing is normal; if normal, step 123 is performed, otherwise, step 118 is performed;

step 118: whether ringing voltage correction peak values of all levels corresponding to the user-defined application scenario are selected and tested is determined; for example, the ringing voltage is encapsulated into five (there are more levels in a few products) increasing levels from 60V to 90V (a voltage of a few products is 30V to 150V); if the ringing is abnormal after the five levels are all tested, step 119 is performed; otherwise, step 117 is performed after a corresponding ringing voltage correction parameter is selected from other unselected ringing voltage correction parameters and set;

step 119: the SLIC detests that the 112 test of the ringing is still abnormal, then the SLIC still modifies the application scenario into a user-defined application scenario, and sets the parameter of the VOIP terminal in combination with a peak value of the ringing voltage and an offset value of the ringing voltage;

for example, setting and testing may be specifically performed by selecting three (there are more levels in a few products) increasing levels having ringing voltage offset values of 0V to 30V (a voltage offset of a few products is 0V to 60V) in turn at a relatively high level (e.g. 90V) in ringing voltage peak values of 60V to 90V;

step 120: the SLIC tests the ringing; the ringing may be specifically tested by the 112 test of the ringing, to determine whether the ringing is normal; if normal, step 123 is performed, otherwise, step 121 is performed;

step 121: whether ringing voltage correction offset values of all levels corresponding to the user-defined application scenario are selected and tested is determined; for example, if the three levels are all tested and the SLIC detects that the 112 test of the ringing is abnormal, step 122 is performed, otherwise, step 123 is performed;

step 122: it is indicated that proper ringing configuration cannot be found, and a failure message is returned and the system is exited; and step 123: the SLIC detects that the 112 test of the ringing is normal, which indicates that proper ringing configuration is found and the configuration succeeds; subsequently, the voice management module stores the configuration in a Flash memory; the voice management module may still obtain the ringing configuration even if restarted, and then delivers the ringing configuration to ringing parameter configuration of the SLIC so as to maintain the system.

It should be noted that the tests in the foregoing steps are not limited to 112 test. The 112 test is only used as an embodiment to describe the present disclosure and all testing methods capable of implementing the foregoing purpose are applicable to the embodiments of the present disclosure.

Thus, an SLIC can select corresponding ringing configuration automatically according to a test result after configuration of a ringing parameter is started, so as to finally implement normal ringing of a voice user terminal according to a VOIP terminal and a ringing parameter setting method therefor provided by the embodiments of the present disclosure. Compared with the prior art, the embodiments of the present disclosure at least have the following two major advantages: (1) the SLIC, which has many application scenarios and ringing configuration with ringing voltage levels and ringing voltage offset levels, is capable of outputting various ringing signals to be selected; (2) appropriate ringing configuration is found automatically, and a 112 test of the SLIC is able to learn whether a current environment and ringing of the voice user terminal are normal, and if not normal, continues to modify the ringing parameter and test the ringing until ringing becomes normal. Therefore, the problem that ringing is abnormal may be solved rapidly, and operation cost may be reduced.

The forgoing content is provided for further describing the present disclosure in details in combination with specific embodiments and it shall not be construed that specific implementation of the present disclosure is limited to these descriptions. For those of ordinary skill in the art, several simple deductions or replacements may be further made without departing from the conception of the present disclosure, and these deductions or replacements should be considered as belonging to the protection scope of the present disclosure.

What is claimed is:

1. A method for setting a ringing parameter for a Voice over Internet Protocol (VOIP) terminal, comprising:
   detecting an application scenario of a VOIP terminal;
   matching a ringing parameter according to a detection result; and
   setting the VOIP terminal according to the ringing parameter;
   wherein the application scenario comprises a long-line single-machine application scenario, a short-line single-machine application scenario, a long-line multi-machine application scenario and a short-line multi-machine application scenario;
   wherein a corresponding ringing parameter is set for each application scenario;
   a voice user terminal is connected to the VOIP terminal via a connecting line;
   detecting the application scenario of the VOIP terminal comprises:
   detecting the number of voice user terminals currently connected with the VOIP terminal, and detecting a loop resistance between the VOIP terminal and the voice user terminals;
   when it is determined that the number of the voice user terminals is larger than or equal to 2, and a resistance value of the loop resistance is larger than a preset resistance value, determining that the VOIP terminal is in the long-line multi-machine application scenario currently;
   when it is determined that the number of the voice user terminals is larger than or equal to 2, and a resistance value of the loop resistance is smaller than or equal to the preset resistance value, determining that the VOIP terminal is in the short-line multi-machine application scenario currently;
   when it is determined that the number of the voice user terminals is smaller than 2, and a resistance value of the loop resistance is smaller than or equal to the preset resistance value, determining that the VOIP terminal is in the short-line single-machine application scenario currently;
   when it is determined that the number of the voice user terminals is smaller than 2, and a resistance value of the loop resistance is larger than the preset resistance value, determining that the VOIP terminal is in the long-line single-machine application scenario currently.

2. The method for setting a ringing parameter for a VOIP terminal according to claim 1, wherein the application scenario comprises a single-machine application scenario and a multi-machine application scenario; wherein a corresponding ringing parameter is set for each application scenario;
   accordingly, detecting the application scenario of the VOIP terminal comprises: detecting the number of voice user terminals currently connected to the VOIP terminal, and when the number of the voice user terminals is larger than or equal to 2, determining that the VOIP terminal is in the multi-machine application scenario currently, otherwise, determining that the VOIP terminal is in the single-machine application scenario.

3. The method for setting a ringing parameter for a VOIP terminal according to claim 1, wherein the application scenario comprises a long-line application scenario and a short-line application scenario; wherein a corresponding ringing parameter is set for each application scenario;
   detecting the application scenario of the VOIP terminal comprises: detecting a loop resistance between the VOIP terminal and a voice user terminal, and when a resistance value of the loop resistance is larger than a preset resistance value, determining that the VOIP terminal is in the long-line application scenario currently, otherwise, determining that the VOIP terminal is in the short-line application scenario.

4. The method for setting a ringing parameter for a VOIP terminal according to claim 2, wherein detecting the number of the voice user terminals currently connected to the VOIP terminal comprises:
   detecting ring streams received by the VOIP terminal, and determining, according to the number of the detected ring streams, the number of the voice user terminals currently connected to the VOIP terminal.

5. The method for setting a ringing parameter for a VOIP terminal according to claim 2, wherein the ringing parameter comprises a ringing voltage parameter.

6. The method for setting a ringing parameter for a VOIP terminal according to claim 5, wherein the ringing voltage parameter comprises a peak value, and/or an effective value, and/or a frequency, and/or an offset value of a ringing voltage.

7. The method for setting a ringing parameter for a VOIP terminal according to claim 5, after setting the VOIP terminal according to the ringing parameter, the method further comprising: testing, according to the ringing parameter which has been set, ringing of the voice user terminals connected with the VOIP terminal to determine whether the ringing is normal; if not normal, then correcting the ringing parameter.

8. The method for setting a ringing parameter for a VOIP terminal according to claim 7, wherein the application scenario further comprises a user-defined application scenario, for which a ringing voltage correction parameter is set;
   correcting the ringing parameter comprises: setting the VOIP terminal according to the ringing voltage correction parameter, then testing, according to the ringing voltage correction parameter which has already been set, ringing of the voice user terminals connected with the VOIP terminal to determine whether the ringing is normal.

9. The method for setting a ringing parameter for a VOIP terminal according to claim 8, wherein the ringing voltage correction parameter comprises ringing voltage correction peak values of a plurality of levels;

setting the VOIP terminal according to the ringing voltage correction parameter and testing the ringing of the voice user terminals connected with the VOIP terminal comprises: selecting, according to a first preset rule, a ringing voltage correction peak value of a corresponding level from the ringing voltage correction peak values of the plurality of levels to set the VOIP terminal, then testing the ringing of the voice user terminals connected with the VOIP terminal until a test result is normal or the ringing voltage correction peak values of the plurality of levels are all selected.

10. The method for setting a ringing parameter for a VOIP terminal according to claim 9, wherein the ringing voltage correction parameter further comprises ringing voltage correction offset values of a plurality of levels;

when the ringing voltage correction offset values of the plurality of levels are all selected and a ringing test result is still abnormal, the method further comprising: selecting, according to a second preset rule, a ringing voltage correction peak value of a corresponding level from the ringing voltage correction peak values of the plurality of levels, and selecting, according to a third preset rule, a ringing voltage correction offset value of a corresponding level from the ringing voltage correction offset values of the plurality of levels, so as to set the VOIP terminal, then testing the ringing of the voice user terminals connected with the VOIP terminal until a test result is normal, or the ringing voltage correction peak values of the plurality of levels and/or the ringing voltage correction offset values of the plurality of levels are all selected.

11. A Voice over Internet Protocol (VOIP) terminal, comprising:
at least one processor; and
a memory;
wherein the memory is configured to, with the at least one processor, cause the (VOIP) terminal to perform actions comprising:
an application scenario detecting module, a parameter matching module and a parameter setting module, the application scenario detecting module is configured to detect an application scenario of the VOIP terminal, and send a detection result to the parameter matching module;
the parameter matching module is configured to match a ringing parameter according to the detection result, and send the ringing parameter to the parameter setting module; and
the parameter setting module is configured to set the VOIP terminal according to the ringing parameter;
wherein the application scenario comprises a long-line single-machine application scenario, a short-line single-machine application scenario, a long-line multi-machine application scenario and a short-line multi-machine application scenario;
wherein a corresponding ringing parameter is set for each application scenario;
a voice user terminal is connected to the VOIP terminal via a connecting line;

detecting the application scenario of the VOIP terminal comprises:
detecting the number of voice user terminals currently connected with the VOIP terminal, and detecting a loop resistance between the VOIP terminal and the voice user terminals;
when it is determined that the number of the voice user terminals is larger than or equal to 2, and a resistance value of the loop resistance is larger than a preset resistance value, determining that the VOIP terminal is in the long-line multi-machine application scenario currently;
when it is determined that the number of the voice user terminals is larger than or equal to 2, and a resistance value of the loop resistance is smaller than or equal to the preset resistance value, determining that the VOIP terminal is in the short-line multi-machine application scenario currently;
when it is determined that the number of the voice user terminals is smaller than 2, and a resistance value of the loop resistance is smaller than or equal to the preset resistance value, determining that the VOIP terminal is in the short-line single-machine application scenario currently;
when it is determined that the number of the voice user terminals is smaller than 2, and a resistance value of the loop resistance is larger than the preset resistance value, determining that the VOIP terminal is in the long-line single-machine application scenario currently.

12. The VOIP terminal according to claim 11, wherein the application scenario comprises a single-machine application scenario and a multi-machine application scenario, wherein a corresponding ringing parameter is set for each application scenario; detecting, by the application scenario detecting module, the application scenario of the VOIP terminal comprises: detecting, by the application scenario detecting module, the number of voice user terminals currently connected to the VOIP terminal, and when the number of the voice user terminals is larger than or equal to 2, determining that the VOIP terminal is in the multi-machine application scenario currently, otherwise, determining that the VOIP terminal is in the single-machine application scenario; or, the application scenario comprises a long-line application scenario and a short-line application scenario, wherein a corresponding ringing parameter is set for each application scenario; detecting, by the application scenario detecting module, the application scenario of the VOIP terminal comprises: detecting, by the application scenario detecting module, a loop resistance between the VOIP terminal and a voice user terminal, and when a resistance value of the loop resistance is larger than a preset resistance value, determining that the VOIP terminal is in the long-line application scenario currently, otherwise, determining that the VOIP terminal is in the short-line application scenario.

13. The VOIP terminal according to claim 12, wherein detecting the number of the voice user terminals currently connected to the VOIP terminal comprises:
detecting ring streams received by the VOIP terminal, and determining, according to the number of the detected ring streams, the number of the voice user terminals currently connected to the VOIP terminal.

14. The VOIP terminal according to claim 12, wherein the ringing parameter comprises a ringing voltage parameter.

15. The VOIP terminal according to claim 14, wherein the ringing voltage parameter comprises a peak value, and/or an effective value, and/or a frequency, and/or an offset value of a ringing voltage.

16. The VOIP terminal according to claim 14, wherein the VOIP terminal further comprises a testing module and a correcting module;

the testing module is configured to test, according to the ringing parameter which has been set, ringing of the voice user terminals connected with the VOIP terminal to determine whether the ringing is normal; and the correcting module is configured to correct the ringing parameter when the testing module determines that the ringing is abnormal.

17. The VOIP terminal according to claim 16, wherein the application scenario further comprises a user-defined application scenario, for which a ringing voltage correction parameter is set;

correcting, by the correcting module, the ringing parameter comprises:

setting, by the correcting module, the VOIP terminal according to the ringing voltage correction parameter;

then testing, by the testing module, ringing of the voice user terminals connected with the VOIP terminal to determine whether the ringing is normal.

18. The VOIP terminal according to claim 17, wherein the ringing voltage correction parameter comprises ringing voltage correction peak values of a plurality of levels;

setting, by the correcting module, the VOIP terminal according to the ringing voltage correction parameter and testing, by the testing module, the ringing of the voice user terminals connected with the VOIP terminal comprises:

selecting according to a first preset rule, by the correcting module, a ringing voltage correction peak value of a corresponding level from the ringing voltage correction peak values of the plurality of levels to set the VOIP terminal;

then testing, by the testing module, the ringing of the voice user terminals connected with the VOIP terminal until a test result is normal or the ringing voltage correction peak values of the plurality of levels are all selected.

19. The VOIP terminal according to claim 18, wherein the ringing voltage correction parameter further comprises ringing voltage correction offset values of a plurality of levels;

when the ringing voltage correction offset values of the plurality of levels are all selected and a ringing test result is still abnormal, the correcting module is further configured to select, according to a second preset rule, a ringing voltage correction peak value of a corresponding level from the ringing voltage correction peak values of the plurality of levels, and select, according to a third preset rule, a ringing voltage correction offset value of a corresponding level from the ringing voltage correction offset values of the plurality of levels, so as to set the VOIP terminal; and the testing module is further configured to test the ringing of the voice user terminals connected with the VOIP terminal until a test result is normal, or the ringing voltage correction peak values of the plurality of levels and/or the ringing voltage correction offset values of the plurality of levels are all selected.

\* \* \* \* \*